R. KNOPP & J. G. BIEHLER.
LABELING MACHINE.
APPLICATION FILED MAY 7, 1915.

1,263,565.

Patented Apr. 23, 1918.
8 SHEETS—SHEET 5.

R. KNOPP & J. G. BIEHLER.
LABELING MACHINE.
APPLICATION FILED MAY 7, 1915.

1,263,565.

Patented Apr. 23, 1918.
8 SHEETS—SHEET 8.

Witnesses
Eric Ischinger
Edna K. Booth

Inventor
Joseph G. Biehler
Rudolph Knopp
By Frank Keiper
Attorney

UNITED STATES PATENT OFFICE.

RUDOLPH KNOPP AND JOSEPH G. BIEHLER, OF ROCHESTER, NEW YORK.

LABELING-MACHINE.

1,263,565.     Specification of Letters Patent.     Patented Apr. 23, 1918.

Application filed May 7, 1915. Serial No. 26,650.

*To all whom it may concern:*

Be it known that I, RUDOLPH KNOPP, a subject of the Emperor of Austria, and I, JOSEPH G. BIEHLER, a citizen of the United States, residing at Rochester, in the county of Monroe and State of New York, have invented certain new and useful Improvements in Labeling-Machines, of which the following is a specification.

The object of this invention is to provide an improved machine for applying labels or revenue stamps to boxes or packages.

Another object of the invention is to make the machine so that it can be adjusted to work on boxes of different sizes and to place the labels in different positions on the box.

These and other objects of the invention will be fully illustrated in the drawings, described in the specification and pointed out in the claims at the end thereof.

In the drawings.

In the drawings like reference numerals refer to like parts.

Reference numeral 1 indicates the frame of the machine which is made up of the end pieces or supports 2 and 3 and the bars 4 and 5 by which they are connected. These bars are also connected by the cross bar 6, which is shown in cross section in Fig. 8.

Mounted on this frame is the main driving shaft 7 having the hand wheel 8 on the one end thereof and the driving pulley 9 on the other end thereof. On this shaft are keyed the sprocket wheels 10 and 11 by which the sprocket chains 12 and 13 are driven by which sprocket chains the packages or boxes are fed through the machine.

On the shaft 7 is keyed the gear 14 by which the main mechanism of the machine is driven. The pulley 9 is mounted to rotate loosely on the shaft 7. The clutch 205 is splined on the shaft and is provided with the two spring pressed pins 206 that make engagement with suitable recesses in the hub of the wheel 9. The clutch 205 is thrown by a yoke 207 that engages therewith to which in turn is attached a bar 208 that extends across under the machine to the other side thereof and terminates in a handle 209 by which it may be conveniently operated. By shifting the clutch the shaft 7 and gear 14 may be driven for the purpose of operating the machine.

Pivoted on the shaft 7 is the bracket 15 having the studs 16 and 17 thereon on which are mounted to rotate the gears 18 and 19. The gear 18 meshes with the gear 14 and the gear 19 meshes in turn with the gear 18. The plate 15 is clamped in position against the bar 4 by means of the machine screw 20. The gear 18 moves with the bracket 15 radial to the gear 14 and remains in mesh therewith and the gear 19 moves toward and away from the gear 21 which is keyed to the shaft 22, which shaft is supported on the carriage 80 which will presently be described.

A bar 23 is provided having vertical slots therein through which extends machine screws 24, 25, 26 and 27 by which it is clamped to the side bar 4. Riveted to the bar 23 is the bar 28. Passing through the bar 4 are the thumb screws 29 and 30 which are threaded in the bar 4 and the ends of which bear against the bar 28. The bar 23 may be released by loosening the machine screws 24, 25, 26 and 27 after which the bar may be raised or lowered by turning the thumb screws 29 and 30 until the bar 28 is in the desired position after which the machine screws 24, etc., may be tightened up clamping the bars 23 and 28 in position. This adjustment is necessary in adapting the machine to working on boxes or packages of different thicknesses as will be presently described.

On these bars 23 and 28 is supported the magazine in which the labels are carried, a selecting mechanism by which they are fed one at a time from the magazine, the paste box and the coating device by which the paste is taken from the paste box and applied to the labels, and the mechanism by which the label is finally placed and held in position for application to the box or package. All the foregoing parts are raised or lowered in the adjustment of the bars 23 and 28.

The hopper which carries the boxes or packages is not supported by the bars 23 and 28 and is not disturbed by an adjustment thereof.

Mounted on the bars 23 and 28 are the cross bars 31, 32, 33 and 34. Mounted on the bars 4 and 5 are the cross bars 35 and 36 extending between which bars and supported by them are the bars 37, 38, 39 and 40 which run the length of the machine and support the packages as they pass through the machine from the hopper at one end to the other end. The cross bar 6 is also supported by the bars 4 and 5 and in turn the bar 6 supports the bracket 41 on which in turn is supported the free end of the cross bar 42, the opposite end of which is supported by the bar 5. It will be understood by this that the bar 42 does not extend across to the bar 4 but stops short of the bar 4 and bars 23 and 28 to permit the vertical independent adjustment of the bars 23 and 28 without interference with the bar 42. The bars 37, 38, 39 and 40 are supported by and fastened to cross bar 42 and from the cross bar 42 to the right in Fig. 8 to the cross bar 35 extends a bar 43 filling the intervals between the bars 38 and 39, the bars 38, 43 and 39 making a continuous platform which supports the revenue stamp and presses it against the package as the package moves along through the machine.

Fastened to the underside of the cross bars 31, 32, 33 and 34 are the bars 44, 45, and 46 between which and the bars 37, 38, 39 and 40 to the packages are guided through the machine. The bars 37, 38, 39 and 40 run substantially the full length of the machine while the bars 44, 45 and 46 start with the bar 31 at the forward end of the hopper and run substantially the full length of the machine. Fastened to the bar 4 is the upright 47 and fastened to the bar 5 is the upright 48. Between these two uprights extend the cross pieces 49 and 50 to which in turn are fastened the upright angles 51, 52, 53 and 54 which constitute the hopper for the boxes, these uprights being fastened to the cross pieces 49 and 50 as follows:

A bracket 55 is provided with a lug therein that extends between the bars 49 and 50 and through this bracket and through this lug extends a pin 56 having a reduced threaded end that is engaged by the nut 57 and washer 58 by which the pin 56 and bracket 55 are adjustably clamped in place on the cross bars 49 and 50. The upright 52 is fastened to the bracket 55 and moves therewith. To the bottom of the bracket 55 is fastened the forward end of the guide bar 59 which guide bar bears against the side or edge of each of the packages as they move through the machine and hold the packages to the proper line of travel. A bracket 60 similar to the bracket 55 is in like manner fastened to the cross bars 49 and 50 and at the bottom thereof is in like manner supported the forward end of the bar 61 which like the bar 59 bears against the opposite side of each of the packages and holds them to the direct line of travel. The rear end of the bar 59 is provided with a pin 214 that extends laterally therefrom. A post 215 is fastened to the bar 4. This post has an opening therein that is adapted to receive the pin 214 and a screw 216 is provided with which the pin 214 and bar 49 may be fastened in any desired adjustment. On the bar 61 a pin 217 is provided which in like manner engages with a post 218 fastened on the bar 5 and a screw 219 clamps it in the post in the desired adjustment. By this device the side bars 59 and 61 may be clamped at the rear end to correspond with their setting in the hopper at the forward end of the machine.

Mounted on the pin 56 is the bracket 62, this bracket being adjustable thereon and held in place by the set screw 63. A similar bracket 64 is mounted on the pin 65 and is held in place by the set screw 66. These brackets support the angles 53 and 54 and are adjustable along the pins 56 and 65 to vary the length of the hopper and the brackets 55 and 60 are adjustable toward and away from each other on the cross bars 49 and 50 to vary the width of the hopper, to accommodate the hopper to the different sizes of the boxes that the machine may be called upon from time to time to handle. The brackets 62 and 64 have at the bottom thereof a sliding engagement with the bars 59 and 61 by which engagement the brackets and angles are held in an upright position.

Figure 7:
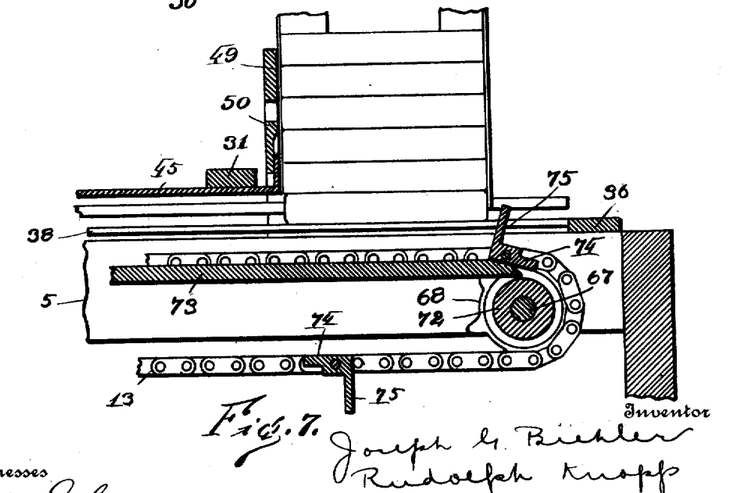
Fig. 7 is a vertical section through the box feeding mechanism on the line $7^x$—$7^x$ of Fig. 3.

As shown in Fig. 7 the ends of the bars 44, 45 and 46 are upturned and engage with recesses in the bars 50 and make a sliding engagement therewith so that as the bars 23 and 28 are raised and lowered the bars 44, 45 and 46 will make constant engagement with the cross bar 50 as they rise and fall with the bars 23 and 28. As shown in Fig. 7 the upturned ends of the bars 45, etc., are countersunk into the cross bar 50.

Figure 6:
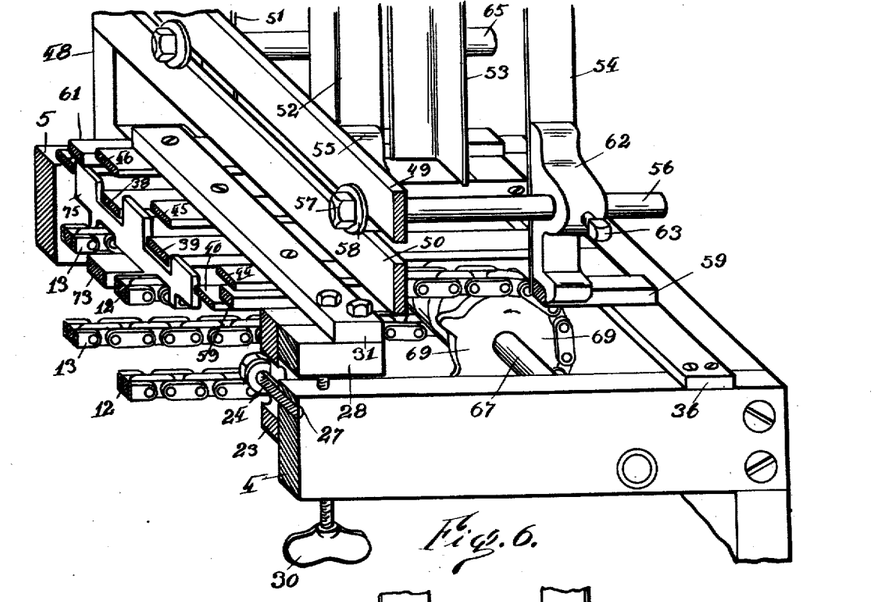
Fig. 6 is a perspective view of the machine frame and box feeding mechanism, the machine frame being sectioned on the line $6^x$—$6^x$ of Fig. 3.

Mounted to rotate between the bars is the shaft 67 on which is keyed the sprocket wheels 68 and 69 on which travel the sprocket chains 12 and 13. The sprocket wheels 68 and 69 are separated by a collar 72 placed on the shaft 67 spacing them apart, this collar having an annular recess sunk therein. From this annular recess extends forward a guide or supporting bar 73 with which engage the tails 74 of the dogs 75 that are carried between the chains 12 and 13. These dogs are upturned at the forward end and are provided with fingers that extend up between the guide bars 37, 38, 39 and 40 and are adapted to engage with the bottom package of the hopper and push it forwardly out of the hopper and through the machine between the upper and lower sets of guide bars and the side bars heretofore described. The bar 73 is supported from the bar 5 by means of the brackets 76 and 77. The dogs 75 are shown in perspective in Fig. 6. As the dogs are carried forward by the chain the tails 74 of the dogs will act on the bar 73 and hold the fingers in an upright position and this position is maintained until the tail of the dog passes beyond the forward end of the bar 73 at which point or shortly thereafter the fingers engage with the cross bar 42 causing the dog to swing to the position shown in Fig. 8 permitting it to pass under the cross bar. The sprocket chains 12 and 13 at their forward ends pass around the sprocket wheels 10 and 11 which are separated by a collar similar to the collar 72 which separates the sprocket wheels 68 and 69.

Figures 8, 19, 20:
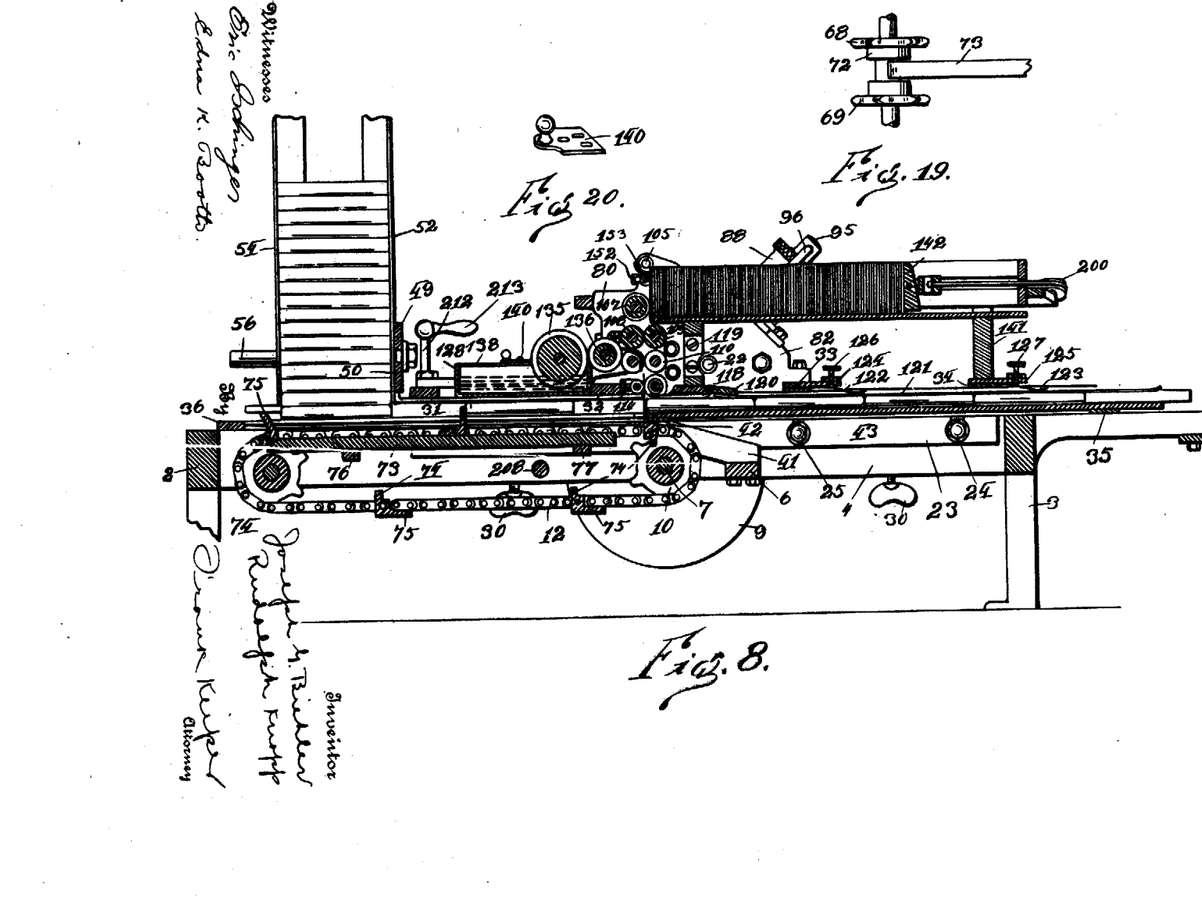
Fig. 8 is a vertical section through the machine on the line $8^x$—$8^x$ of Fig. 3.
Fig. 19 is a top plan view of the rear sprocket wheels and guide bar.
Fig. 20 is a perspective view of the scraper mounted on top of the paste box.

The operation of the sprocket chains and their dogs is to carry the packages from the hopper forward with regular intervals between the packages as is shown in Fig. 8, the packages being left by the sprocket chain at the point where the dogs disengage therefrom just after the label has been affixed thereto, after which the succeeding package pushes against the preceding package which packages make a continuous row, the last package when it is pushed forward by the conveyer at the left end of Fig. 8 causes the first package at the right end to be pushed out of the machine.

Supported on the cross bars 32 and 33 is the carriage 80 which carriage comprises the upright plates 81 and 82 which plates are spaced apart by the shouldered bolts 83 and 84. Mounted to rotate in the upright plates 81 and 82 is the shaft 22 which carries the gear 21 heretofore described which gear is on the outside of the plate, the shaft 22 extending through the plate. This shaft is the driving shaft for the label feeding and pasting mechanism.

Between the two plates on the shaft 22 is carried the gear 85 and the cam 86 both of which are keyed to the shaft and rotate therewith. The cam 86 is grooved for driving the suction pump 88, which pump is supported by a plate 87 mounted on the upright plates 81 and 82. This pump has a piston 89 therein which is driven in one direction by the cam 86 and in the other direction by the spring 90. The piston is formed with a cup 91 having an opening therein through which the reduced end of the piston rod 92 extends, the piston rod having a shoulder that completely covers and closes the opening. A round block 93 is provided in the piston with which the threaded end of the piston rod 92 engages and by which engagement the piston rod 92, the piston 91 and block 93 are all securely fastened together. An annular opening is left between the block 93 and the piston 91 in which the spring 90 engages. The block 93 is used not only to hold the spring in place but also to reduce the clearance, so that as the piston is driven forward by the spring it will produce suction and make a strong vacuum. An opening 94 is provided in the plate 87 so that the air may pass in and out as the piston operates. On top of the cylinder of the pump 88 is a dome 95 which has an opening therein with which communicates a tube 96 by which the suction of the pump is transmitted to the pneumatic selecting device that will presently be described.

Figure 2:
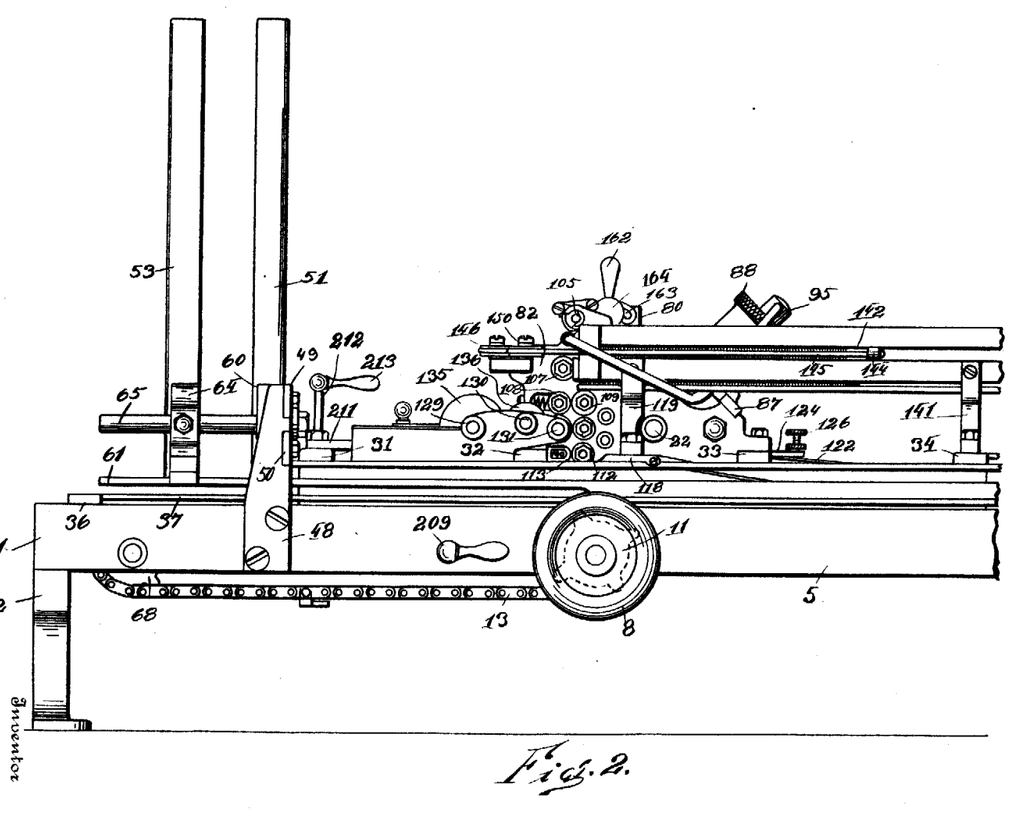
Fig. 2 is a side elevation of the machine, the elevation being taken on the side opposite to that shown in Fig. 1, the right hand end of the machine, as shown in this figure, being partly broken away.
Figure 3:
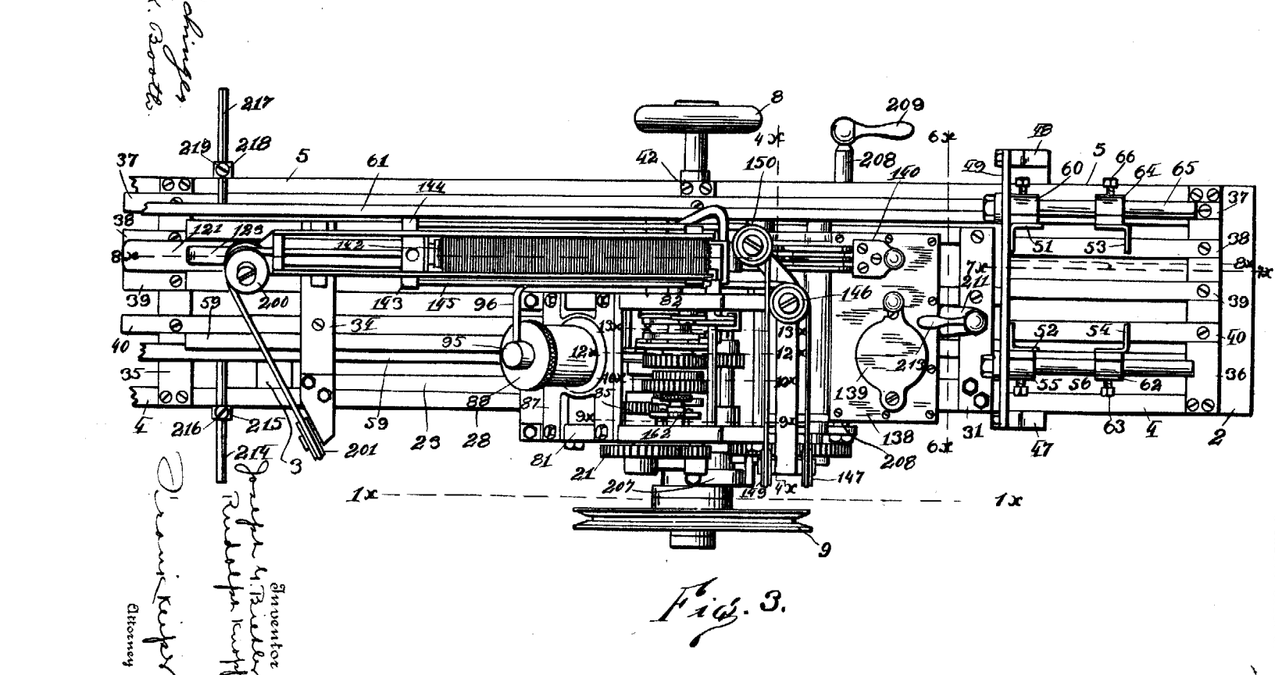
Fig. 3 is a top plan view of the machine, the left hand end of the machine as shown in this figure being partly broken away.

Mounted to rotate continuously between the plates 81 and 82 are the shafts 97, 98, 99, 100, 101, 102 and 103. Also mounted between these plates is the shaft 104 which rotates intermittently. Also mounted between these plates are the shafts 105 and 106 which have a rocking motion. The shafts 97, 98, 101, 100 and 104 all extend outside of the plate 82 as appears in Figs. 2 and 4.

On the shaft 104 is the rubber coated feed roller 107 which feeds the first or end label from the magazine. On the shafts 100 and 101 are the solid metal rollers 108 and 109 which grip the label and pass it downward. As appears in Fig. 4 the roller 108 is firmly but yieldingly pressed against the roller 109 by a spring so as to exert a uniform pressure on the label that is fed between them.

Figures 4, 5, 21:
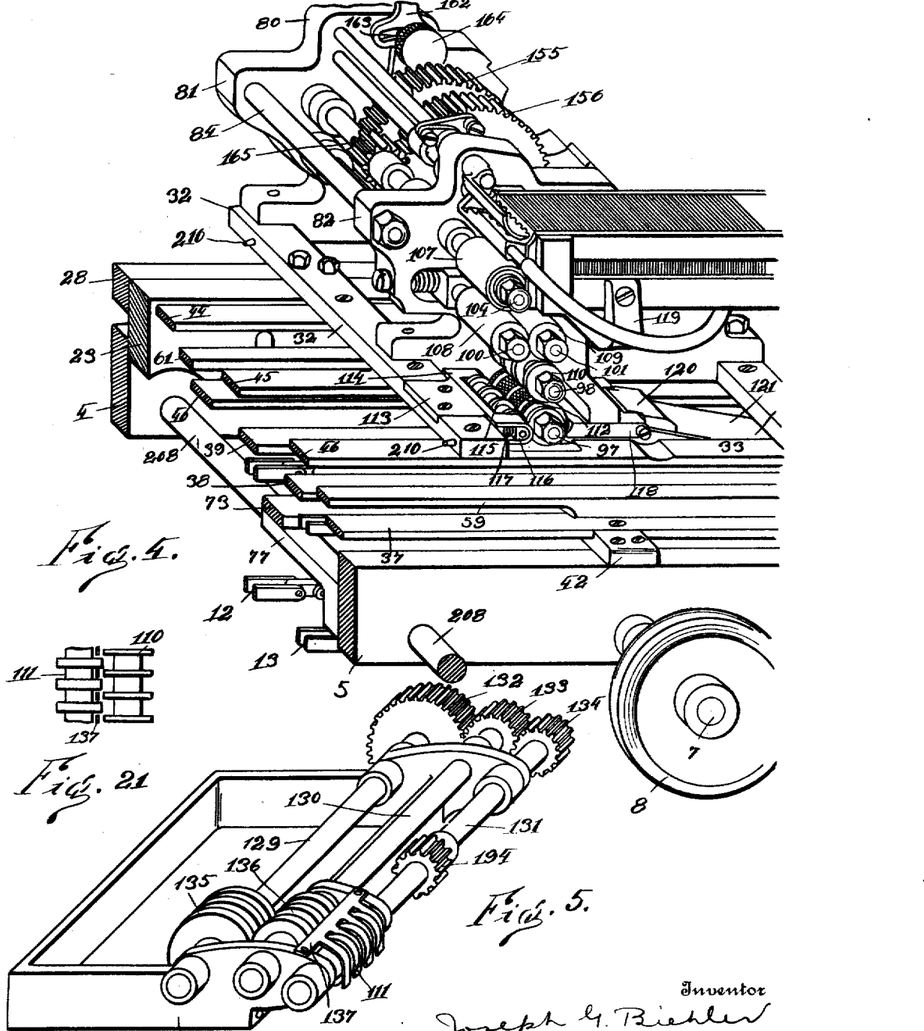
Fig. 4 is a perspective view of a portion of the machine frame and the label feeding mechanism, the machine frame being shown in vertical section, the section being taken on the line $4^x$—$4^x$ of Fig. 3, the paste box being omitted.
Fig. 5 is a perspective view of the paste box and paste feeding mechanism.
Fig. 21 is a top plan view of the paste applying rollers.

On the shaft 98 is the grooved roller 110 which presses the label against the corresponding grooved glue roller 111 shown in Figs. 5 and 21, the details of which will presently be described. On the shaft 97 is the grooved feeding and supporting roller 112 which roller operates to hold the label in position so that it will make suitable contact with the box and then press the label against the box as the box passes thereunder with the label. Mounted on the cross bar 32 is the bracket 113 on which is formed a yoke 114 in which is journaled a grooved pressing roller 115. This roller rotates in boxes 116 which boxes are mounted to slide in suitable recesses provided therefor in the ends of the yoke. This roller 115 is driven by frictional contact with the roller 112 or with the label that passes between the two rollers. The roller 115 is evenly pressed forward by the springs 117 provided therefor in the recesses of the yoke. The collars formed on the roller 115 will occur out of line with the collars on the roller 111 so that the collars on roller 115 will not make contact with the pasted surface of the label, it being understood that the roller 111 will apply the paste to the label in narrow lines leaving dry strips on the label between said lines and it is with these dry strips on the label that the collars on the roller 115 make contact.

The roller 112 is grooved with three grooves for a purpose that will now be explained. Mounted back of the roller is a block 118 which block is supported from the bracket 119 fastened to the upright plate 82. At the forward end of this block project three fingers which fingers extend clear through the grooves of the roller 112 on the underside thereof, the purpose of these fingers being to strip the label from the roller in case the label adheres to the roller and thereby prevents the label from following the roller around. This holds the label in such a position as to assure the adhesion of the label to the package as it passes under the roller and under the block 118. These fingers are formed preferably so as to extend along the under side of the block.

Pivotally fastened to the block 118 is a block 120 to which is connected the spring pressing blade 121 under which the label or stamp passes as the package moves rearwardly in the machine by which spring the label is yieldingly pressed against the package. The pressure of this spring is reinforced by the spring 122 and 123, the spring 122 being supported from cross bar 33 and the spring 123 being supported from the cross bar 34. Blocks 124 and 125 are rigidly supported on these cross bars each of which blocks supports an adjusting screw 126 and 127, which screw is adapted to bear against the springs 122 and 123 and vary the pressure that is exerted by the main spring 121 on the label as it passes thereunder with the box.

Carried on the bars 44, 45 and 46 between the cross bars 31 and 32 is the paste box 128, which box has the shafts 129, 130 and 131 mounted to rotate inside thereof. On the right hand end of these shafts, as shown in Fig. 5, are placed the driving gears 132, 133 and 134. Mounted on the shaft 129 is the grooved pasting roller 135, the collars and flanges of which are adapted to bear against the collars of the grooved pasting roller 136, the collars of which are in turn adapted to bear against the collars of the grooved pasting roller 111. The paste is contained in the box 128 and is carried up by the roller 135 and by it placed on the roller 136 and the roller 136 places it upon the roller 111, and as the label or stamp passes down between the roller 111 and the roller 110 the paste or glue is applied to one side thereof in a series of lines, leaving the intermediate parts of the label dry or free from paste. It will also be understood that the collars on the roller 111 do not come opposite to or make contact with the collars on the roller 110, but the collars on the one roller are staggered with reference to the collars on the other roller.

Mounted on the box is a comb 137, the teeth of which project downwardly into the grooves between the collars on the roller 111. These teeth tend to strip the label from the roller so that the label cannot follow the roller around but must travel straight down to a position in which it will stand across the line of travel of the box so as to intercept the box. The teeth of this comb occur in line with the collars on the roller 110 and not the teeth on the comb 137 and the collars on the roller 110 project into the annular grooves on the roller 111, the collars on the roller 110 projecting only slightly into the annular grooves of the roller 111. A slight clearance is allowed between the teeth of the comb 137 and the collars on the roller 110. This insures better contact between the label and the collars on the roller 111 than would otherwise be possible if the collars on the roller 110 did not project into the recesses or grooves of the roller 111. Then too this arrangement of the rollers insures to the label a maximum amount of paste, the excess of which would be squeezed out if the label passed between solid rollers or rollers that were not grooved or between grooved rollers, the collars of which come opposite to each other with or without clearance between them. When the label arrives into contact with the box and is pressed down thereon the excessive paste spreads out over the intermediate dry parts of the label not touched by the roller 111 and coats it so that practically all of the label is coated with paste on the one side and is caused to adhere firmly to the box.

The top of the paste box is closed with a cover plate 138 which has an opening therein to receive the rollers 135 and 136, which top has an opening therein for the introduction of paste which opening is covered by a cover plate 139. The opening for the roller 135 is partially closed by the roller itself and by the teeth formed on the cover plate that engages between the collars or flanges of the roller. A scraping plate 140 is adjustably mounted on the cover plate and is movable toward and away from the roller, it being held in place by screws which pass through short slots in the plate. By this scraping plate 140 the excess of paste is removed from the roller 135 and by adjusting it toward and away from the roller the quantity of or thickness of the film of paste left on the roller may be varied. The forward end of the paste box is recessed to engage with pins or projections 210 provided on the bar 32 that engages therewith. The rear of the box is recessed to receive a button 211 carried on a stem 212, mounted to turn on the cross bar 31, a handle 213 being provided on the stem to facilitate the turning thereof. By turning the handle 213 in one direction, the paste box is engaged by the button and forced forward into contact with the pins and locked in place with the gear 194 in mesh with the pinion 193 by which it is driven. By turning the handle 213 in the other direction the box may be released for removal from the machine.

Mounted on the cross bar 34 is the bracket 141 by which the rear end of the labeling magazine is supported, the forward end of the magazine being supported by the bracket 119. In this magazine is supported the labels, the labels being carried therein on end. A follower 142 is mounted to slide in the magazine from which follower the lugs 143 and 144 project outwardly through a slot on each side of the magazine running the length thereof. Fastened to the lug 143 is a cord 145 which runs forward and around the pulley 146 and then sidewise over the pulley 147 down and around the pulley 148 and up around the pulley 149 and then across to the pulley 150 and back to the lug 144. Connected to the pulley 148 is a weight 151 by which the follower is drawn forward and the labels are held pressed firmly against the roller 107.

The sides of the magazine extend forward and partially overlap the ends of the feeding roller and the ends of the sucker and clamp for selecting the labels, which clamp and sucker will presently be described.

To the back of the follower is attached a cord which passes back through an opening at the back of the magazine and around a pulley 200 mounted on the rear of the magazine and then across to the pulley 201 and down to a treadle 202 at the side of the machine. When it is necessary to put a fresh supply of labels in the magazine the operator can press down the treadle 202 with her foot and draw back the follower and hold it back while she uses both hands to handle the labels and put them in place. When she releases the treadle the weight 151 will operate to draw the follower forward again and press the labels against the roller 107.

By the roller 107 the labels are fed successively from the magazine down between the feed rollers 108 and 109. To prevent the feeding of more than one label at a time a selecting device is provided which separates the end label from the remaining labels of the magazine which selecting device will now be described.

Figure 16:
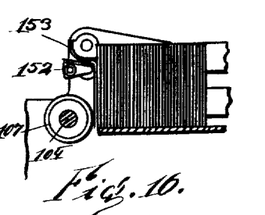
Fig. 16 is a side elevation of the label selecting device showing the pneumatic device rocked to separate the end label from the remaining labels of the magazine.

Mounted on the rock shaft 106 is the pneumatic sucker 152 which is intermittently rocked against the end label of the magazine upon which the pump 89 operates to produce the suction by which the label is drawn firmly against the sucker after which the sucker rocks away carrying the end label with it turning the upper edge of it down to the position shown in Fig. 16 and immediately thereafter the clamping device 153 rocks forward against the upper end of the following label in the magazine and clamps all except the end label between the clamping device and the follower. Immediately thereafter the roller 107 starts to turn and feed the end label, that is thus released, down from the magazine, the clamping device holding the next succeeding label and preventing it from following thereafter. As soon as the roller 107 has fed the label far enough to insure its being caught by the rollers 108 and 109 the roller 107 stops operating.

The roller 107 is positively driven while it is turning to feed the label and this positive driving continues until after the label is gripped by the rollers 108 and 109 after which it ceases and as soon as the positive driving of the roller is finished the roller 107 is released and is permitted to turn idly with the label as the label is drawn down by the rollers 108 and 109, some of which turning may be necessary if a part of the label is still in contact with the roller 107.

The gearing by which the functions of these various parts and their coördination is secured will now be described.

Figure 9:
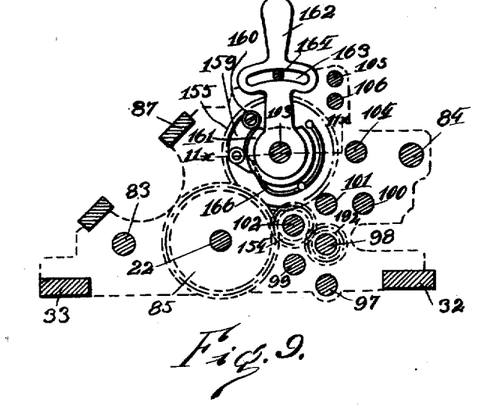
Fig. 9 is a vertical section on the line $9^x$—$9^x$ of Fig. 3 showing a part of the driving mechanism of the machine.
Figures 10, 17:
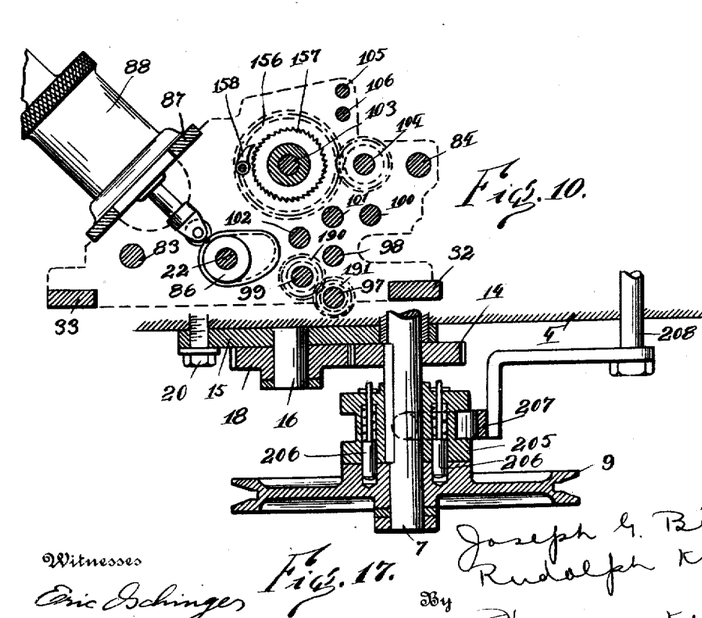
Fig. 10 is a vertical section on the line $10^x$—$10^x$ of Fig. 3 showing another part of the driving mechanism of the machine.
Fig. 17 is a horizontal section on the line $17^x$—$17^x$ of Fig. 1, showing the clutch for driving the machine.
Figure 11:
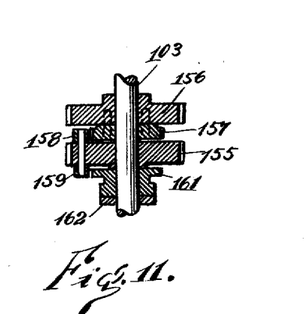
Fig. 11 is a section through a part of the driving mechanism for the label feeding device, the section being taken on the line $11^x$—$11^x$ of Fig. 9.

On the shaft 102 is provided an elongated gear 154 which at one end meshes with the gear 85 and at the other end meshes with the gear 155, (see Fig. 9,) the gear 154 being carried on the shaft 102 and keyed thereto and the gear 155 being carried on the shaft 103 and keyed thereto. Loosely mounted to the shaft 103 is the gear 156 to which is fastened a ratchet 157. Mounted on the gear 155 is the pawl 158, which pawl is supported by a pin that passes through the gear 155 and on the opposite end of which is carried a rocker arm 159 having a crank thereon with an antifriction roller 160. Journaled on the shaft 103 is a cam plate 161 which cam plate is fastened to and is controlled by a lever 162 which lever has a segmental slot 163 therein through which passes the stem of a binding screw 164 carried on the upright plate 81 by which screw the lever 162 may be clamped in any desired position within the limits permitted by the length of the segmental slot. As the gear 155 rotates the pawl and rocker arm are carried around with it and when the rocker arm passes over the raised part of the cam 161 the pawl is held out of engagement with the ratchet wheel and the gear 156 with the ratchet wheel can remain at rest or can turn idly. On the shaft 104 which carries the roller 107 is keyed a pinon 165, which meshes with the gear 156 so that the shaft 104 is driven by the gear 155. (See Figs. 4 and 10.) When the label is being drawn down by the rollers 108 and 109 it will cause the roller 107 to turn and if the pawl 158 is then out of engagement with the ratchet 157 the gear 156 and ratchet 157 will turn idly and as soon as the label has passed beyond the roller 107, the roller 107 and pinion 165, gear 156 and ratchet 157 will remain at rest due to the frictional engagement between the end label of the magazine and the roller 107. The cam 161 is shaped so as to precure a sufficiently long engagement between the pawl 158 and ratchet 157 so as to secure a sufficient drive for the end label that has been selected and the operation of the pawl and the ratchet may be advanced or retarded according to the position of the label on the box that may be desired, the preferred position being with the label lapped over the end of the box with the ends of the label equally lapped over the sides of the box and by shifting the lever 162 the label may be put more on the top of the box or more on the bottom of the box and by shifting the gears that drive the feed chain, so as to change the timing of the dogs 75 with reference to the operation of the roller 107 the label may be placed wholly on top of the box or on the bottom of the box if the box is inverted, that is fed through the machine upside down. This timing of the dogs 75 is secured by dropping the plate 15 so that the gear 19 is no longer in mesh with the gear 21 and then bringing the dogs 75 to the desired position and then raising the plate 15 to bring the gears into mesh again and keep this relation of the parts. This plate 15 can also be adjusted up or down to maintain proper engagement of the driving gears with the gearing of the feeding and pasting mechanism when it is raised or lowered by the adjustment of the frame on which it is carried which adjustment is made to accommodate the machine to boxes of different thicknesses.

Figure 12:
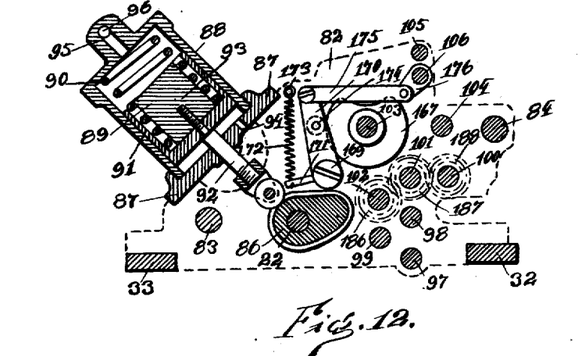
Fig. 12 is a vertical section on the line $12^x$—$12^x$ of Fig. 3.

A spring 166 is provided by which the antifriction roller 160 is always held in engagement with the surface of the cam 161. On the shaft 103 is keyed the cams 167 which operate the pneumatic sucker and the cam 168 which operates the clamping device. (See Fig. 12.)

Figure 14:
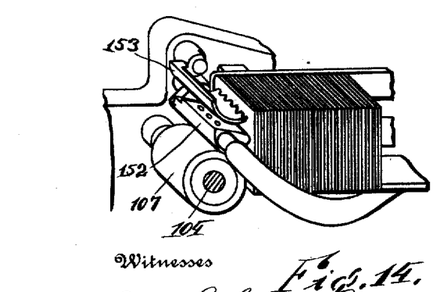
Fig. 14 is a detail perspective view of a portion of the labeling selecting mechanism.
Figure 15:
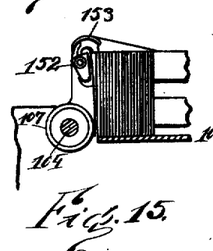
Fig. 15 is a side elevation of the label selecting mechanism showing the pneumatic selecting device making contact with the end label.

Mounted on the plate 82 is the stud 169 on which is carried a lever 170 having a bell crank arm 171 on the lower end thereof, to which is connected a tension spring 172, the upper end of which is connected to a pin 173. On the lever 170 is carried an antifriction roller 174 which bears against the cam 167, being held in engagement therewith by the spring 172. On the upper end of the lever 170 is connected a link 175, the forward end of which is connected to a crank 176 on the rock shaft 106. The cam 167 is shaped and timed so as to secure the rocking of the sucker into contact with the label just at the time that the pump operates to secure a vacuum therein and rock away with the label while the pressure foot 153, see Fig. 14, moves in back of the label until the roller 107 moves to feed the label. Pivotally mounted on the same stud is the lever 177 having a bell crank 178 on the lower end thereof to which is connected a tension spring 179, the upper end of which is fastened to a pin 173. On the lever 177 is mounted an antifriction roller 180 which bears against the cam 168, being held in position therewith by the spring 179. To the upper end of the lever 177 is connected a link 181, the forward end of which engages with the lever 182 pivotally mounted on the stud 183. The forward end of the lever 182 engages with the link 184, the forward end of which link engages with the crank 185 keyed to the shaft 105. On the shaft 105 is secured the clamping or retaining device 153 and the cam 168 is so positioned and shaped as to secure the rocking of the retaining device against the next label in the magazine after the pneumatic device has moved out with the top of the last label of the magazine. Keyed to the shaft 102 is the pinion 186 (see Fig. 12) which meshes with the pinion 187 keyed to the shaft 101, by which shaft is carried the roller 109. On the shaft 100 is carried a pinion 188 which meshes with the pinion 187, by which the shaft 100 is driven and with it the roller 108.

Figures 1, 18:
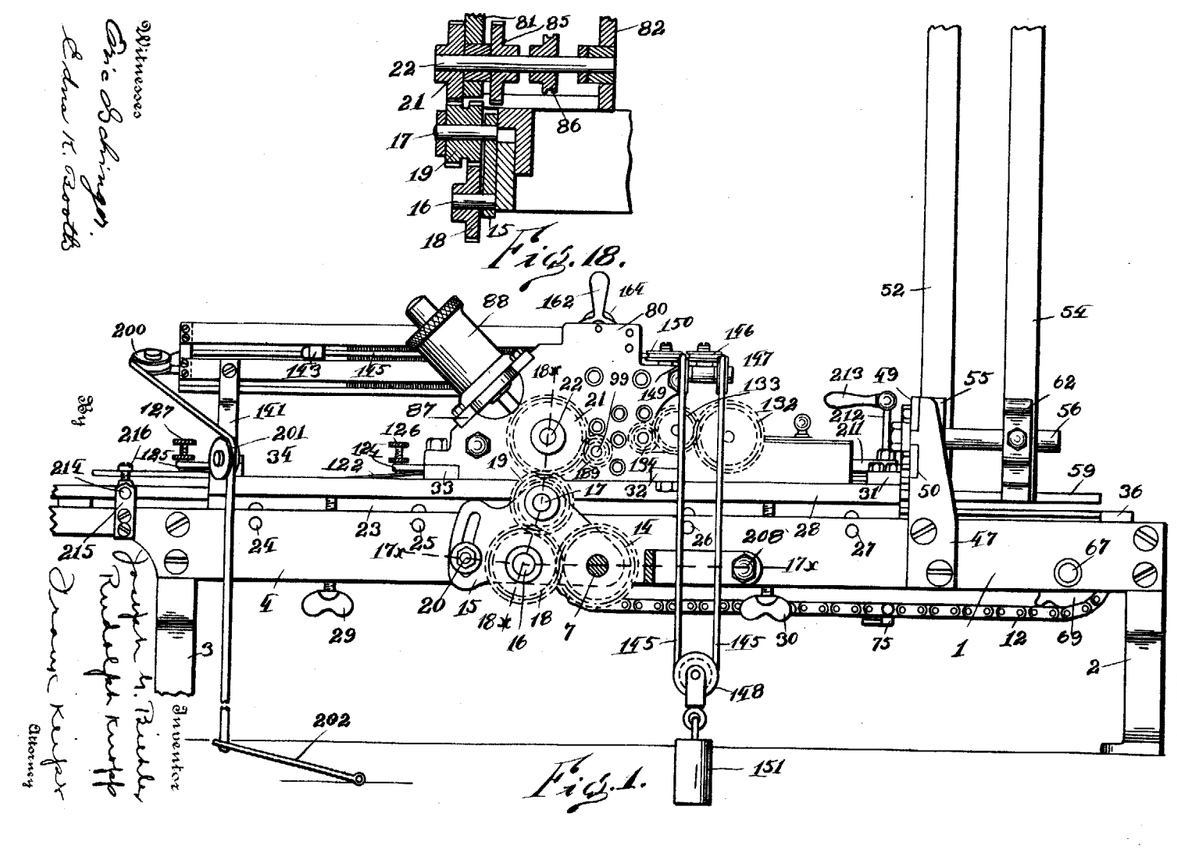
Figure 1 is a side elevation of the machine partly in section, the section being taken on the line $1^x$—$1^x$ of Fig. 3, the left hand end of the machine being partly broken away.
Fig. 18 is a vertical section through part of the driving mechanism, the section being taken on the line $18^x$—$18^x$ of Fig. 1.
Figure 13:
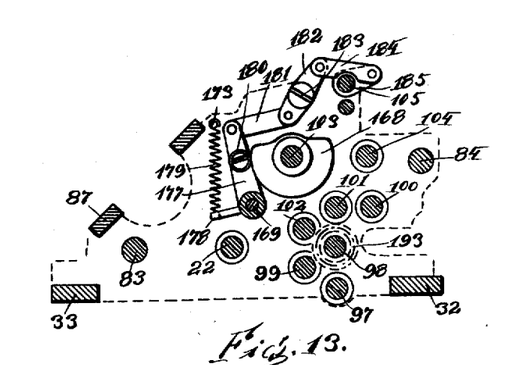
Fig. 13 is a vertical section on the line $13^x$—$13^x$ of Fig. 3.

As heretofore explained the shaft 22 extends outside of the plate 81 and carries thereon outside of the plate the gear 21. This gear meshes with the pinion 189 keyed to the shaft 99 (see Fig. 1), which shaft is an idle shaft and carries thereon the pinion 190 which pinion in turn meshes with the pinion 191 on the shaft 97, (see Fig. 10) on which shaft the grooved roller 112 is carried and by this gearing the shafts 97, 98 and 101 are all driven in the same angular direction and the rollers 107 and 108 are driven in the opposite direction. On the shaft 98 is also carried the pinion 192 which meshes with the pinion 154 (see Fig. 9) and is driven thereby and on the shaft 98 is also carried the pinion 193 (see Fig. 13) which meshes with the pinion 194 on the shaft 131 and through this mechanism the glue rollers are driven.

We claim.

1. In a labeling machine the combination of a hopper for labels having an opening in the end thereof, a roller working against the labels through said opening, power driven means for driving said roller to feed the end label down from said hopper, said driving means operating to drive the roller far enough to start the label down and then temporarily release the roller to allow it to move idly with the label.

2. In a labeling machine the combination of a hopper for labels having an opening in the end thereof, a roller working against the end label through said opening, power driven means for driving said roller to start the end label down from said hopper, means located below the hopper to grip the label fed from the hopper and draw it down, said roller operating thereafter to turn idly with the label as it is drawn down.

3. In a labeling machine the combination of a hopper for labels, a roller working at the end of the hopper to feed the end label downward therefrom, gearing for driving said roller, a ratchet wheel for driving said gearing, a continuously revolving wheel, a pawl mounted thereon adapted to engage with said ratchet wheel, and a cam by which said pawl is moved into and out of engagement with said ratchet wheel.

4. In a labeling machine the combination of a hopper for labels, a roller working at the end of the hopper to feed the end label downward therefrom, gearing for driving said roller, a ratchet wheel for driving said gearing, a continuously revolving wheel, a pawl mounted thereon adapted to engage with said ratchet wheel, and a cam by which said pawl is moved into and out of engagement with said ratchet wheel, said cam being adjustable forward or back to vary the timing of the forward movement of the ratchet wheel and the feed of the label caused thereby.

5. In a labeling machine the combination of a hopper for labels, a roller working at the end of the hopper to feed the end label downward therefrom, gearing for driving said roller, a ratchet wheel for driving said gearing, a continuously revolving wheel, a pawl mounted thereon adapted to engage with said ratchet wheel, and a cam by which said pawl is moved into and out of engagement with said ratchet wheel, said cam being adjustable forward or back to vary the timing of the forward movement of the ratchet wheel and the feed of the label caused thereby without interfering with the operation of the machine.

6. In a labeling machine the combination of a hopper for labels, a roller working at the end of the hopper to feed the end label downward therefrom, gearing for driving said roller, a ratchet wheel for driving said gearing, a continuously revolving wheel, a pawl mounted thereon adapted to engage with said ratchet wheel, and a cam by which said pawl is moved into and out of engagement with said ratchet wheel, an arm on said cam by which it can be shifted forward or back, a segmental slot in said arm having a pin therethrough by which the travel of the arm is limited and by which it may be fastened in place.

7. In a labeling machine the combination of a hopper for labels having an opening in the end thereof, a roller working against the bottom of the end label through said opening, a sucker rocking against and away from the top of the end label, a clamping device adapted to hold all but the end label against movement, and cams for operating both said sucker and said clamping device.

8. In a labeling machine the combination of a hopper for the boxes comprising four upright angles, two cross pieces supported with an opening between them, two pins supported on said cross pieces and extending through said opening, brackets fastened to said angles, said brackets being slidably mounted on said pins, a flange at the bottom of each of said brackets, guides mounted in the machine below the pins and parallel thereto with which said flanges engage to steady said brackets and angles.

9. In a labeling machine the combination of a frame, a runway for the boxes formed threon, a hopper for boxes supported on said frame, the sides of the hopper being adjustable toward and from each other, said runway having guides at the sides thereof, said guides being at one end attached to the sides of the hopper and adjustable therewith, posts on said frame, a pin on the forward end of each of said guides, said pin having sliding engagement with said posts.

10. In a labeling machine the combination of a frame, a runway for the box, the top of said runway being adjustable vertically to adapt the runway to boxes of different heights, said frame having a side bar thereon, a second bar parallel thereto having slots therein and being adjustable vertically along said side bar, a third bar fastened to the said second bar and overhanging the side bar, thumb screws working through the side bar against the third bar by which the second and third bars may be raised and lowered, bolts passing through the slots of the second bar into the first bar for clamping the second and third bars in position on the first bar, the top of said runway being supported from said second and third bars and being adjusted with it.

11. In a labeling machine the combination of a frame, a runway for the box, the top of said runway being adjustable vertically to adapt the runway to boxes of different heights, said frame having a side bar thereon, a second bar parallel thereto having slots therein and being adjustable vertically along said side bar, a third bar fastened to the said second bar and overhanging the side bar, thumb screws working through the side bar against the third bar by which the second and third bars may be raised and lowered, bolts passing through the slots of the second bar into the first bar for clamping the second and third bars in position on the first bar, the top of said runway being supported from said second and third bars and being adjusted with it, label feeding and pasting mechanism being supported from said second and third bars and movable therewith.

12. In a labeling machine the combination of a pair of rollers adapted to feed a label, said rollers being adapted to hold a label suspended in the path of a box, means for feeding a box against said suspended label to connect the box and label, means for varying the timing of the feed of the label to change the position of the label on said box.

13. In a labeling machine the combination of a pair of rollers adapted to feed a label, said rollers being adapted to hold a label suspended in the path of a box, means for feeding a box against said suspended label to connect the box and label, means for varying the timing of the feed of the box to change the position of the label on said box.

14. In a labeling machine the combination of a pair of rollers adapted to feed a label, said rollers being adapted to hold a label suspended in the path of a box, means for feeding a box against said suspended label to connect the box and label, means for varying the feed of both the label and the box to change the position of the label on the box.

15. In a labeling machine the combination of a label feeding and coating mechanism and box feeding mechanism and driving mechanisms therefor, gearing for connecting said driving mechanisms and causing them to coördinate, said connecting gearing being mounted on a plate, a shaft for driving one of said mechanisms, said plate being pivotally mounted on said shaft, said plate being adapted to be swung toward and away from the other driving mechanism.

16. In a labeling machine the combination of label feeding and coating mechanism and box feeding mechanism and driving mechanisms therefor, gearing for connecting said driving mechanisms and causing them to coördinate, said connecting gearing being mounted on a plate, a shaft for driving one of said mechanisms, said plate being pivotally mounted on said shaft, said plate being adapted to be swung toward and away from the other driving mechanism, either of said driving mechanisms being adjustable independent of the other while they are left independent of each other by the swinging of said plate.

17. In a labeling machine the combination of label feeding and coating mechanism and box feeding mechanism and driving mechanisms therefor, one of said feeding mechanisms being capable of being raised and lowered to accommodate the machine to different sized boxes, gearing for connecting said driving mechanisms and causing them to coördinate, said connecting gearing being mounted on a plate, a shaft for driving one of said mechanisms, said plate being pivotally mounted on said shaft, said plate being adapted to be swung to maintain engagement with the feeding mechanism that has been raised or lowered.

In testimony whereof we affix our signatures in presence of two witnesses.

RUDOLPH KNOPP.
JOSEPH G. BIEHLER.

Witnesses:
ELEANOR M. CORCORAN,
EDNA K. BOOTH.

Copies of this patent may be obtained for five cents each, by addressing the "Commissioner of Patents, Washington, D. C."